Feb. 2, 1971  G. M. NEUMANN  3,559,380
ROLLER BAND AIR FILTER ASSEMBLY

Filed Nov. 13, 1968  3 Sheets-Sheet 1

Inventor:
GERHARD MAX NEUMANN
By: Cushman, Darby & Cushman,
Attorneys

Feb. 2, 1971 G. M. NEUMANN 3,559,380
ROLLER BAND AIR FILTER ASSEMBLY
Filed Nov. 13, 1968 3 Sheets-Sheet 2

Inventor:
GERHARD MAX NEUMANN
By: Cushman, Darby & Cushman,
Attorneys

Feb. 2, 1971     G. M. NEUMANN     3,559,380
ROLLER BAND AIR FILTER ASSEMBLY
Filed Nov. 13, 1968     3 Sheets-Sheet 3
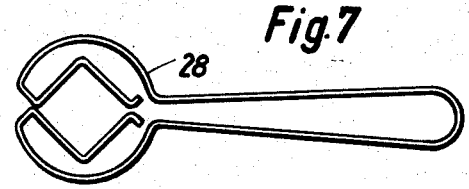
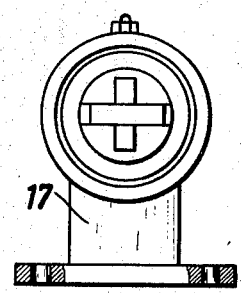
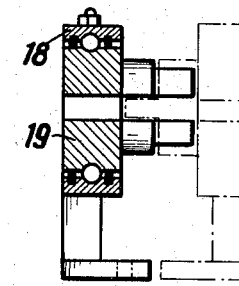
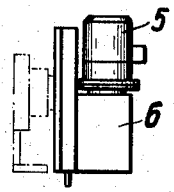
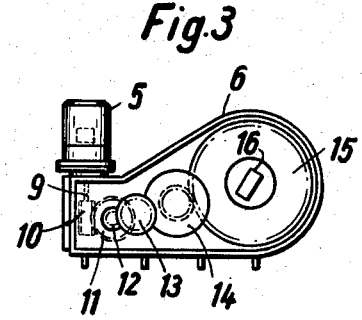
Inventor:
GERHARD MAX NEUMANN
By: Cushman, Darby & Cushman,
Attorneys United States Patent Office 3,559,380
Patented Feb. 2, 1971

3,559,380
ROLLER BAND AIR FILTER ASSEMBLY
Gerhard Max Neumann, Berlin-Dahlem, Germany, assignor to Delbag Luftfilter GmbH, Berlin, Germany
Filed Nov. 13, 1968, Ser. No. 775,290
Claims priority, application Germany, Nov. 22, 1967,
D 37,009
Int. Cl. B01d 46/18
U.S. Cl. 55—354                                             6 Claims

ABSTRACT OF THE DISCLOSURE

In automatic roller band filter assemblies for filtering air, the filter band passes from one bobbin in an upper portion of the assembly through an intermediate sealed filter portion to a driven bobbin in a lower portion of the assembly, the said driven bobbin being driven by a motor associated with the said lower portion.

Figure 1:
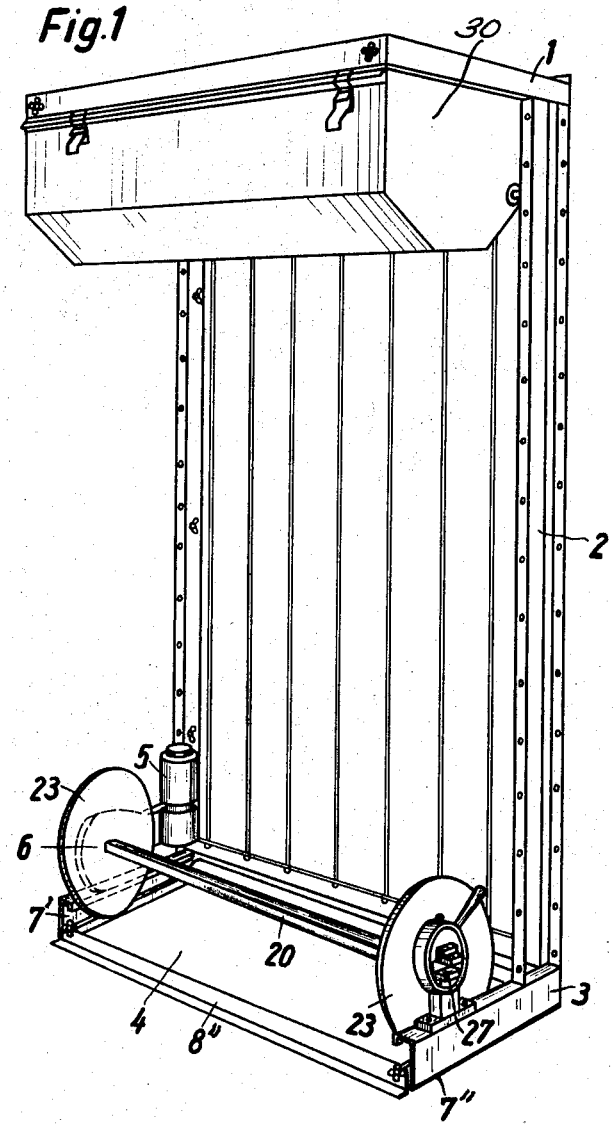

It is often desirable to provide a plurality of assemblies side-by-side as near to each other as possible, and the invention provides an arrangement of motor and gear train on a frame member of the said lower portion whereby an adjacent band filter assembly may be positioned with maximum economy of space, and moreover which allows a plurality of band filter assemblies when arranged side-by-side to be driven by a single motor associated with one of the band filter assemblies.

---

This invention relates to an automatic roller band air filter assembly for filtering air, and particularly relates to such filter assemblies comprising an upper portion having a filter band roll of glass fibre or textile freely rotatably mounted therein, and a lower portion having a driven roller for drawing the filter band off the upper roller across a sealed and filtering intermediate portion of the filter assembly. Prefabricated components comprising the said bottom, intermediate and upper portions, are generally assembled on site and built into an opening in a wall or into a ventilating duct or trunk.

From time to time a fresh roll of filter band is inserted into the upper portion of the filter assembly, the fully wound roll being removed from the bottom portion. This change-over should be rapidly performed with a minimum waste of time. Moreover, the arrangement should be such that several filter units may directly be associated side-by-side, and driven by a single power unit.

The object of the invention is to provide an arrangement whereby these requirements may be met, and the invention consists of an automatic roller band filter assembly, comprising an upper portion, a lower portion and an intermediate sealed filter portion; a roll of filter band on a bobbin freely rotatably mounted in the said upper portion; a driven bobbin mounted on a base frame in the said lower portion and adapted to receive filter band from the said upper portion after passage through the said intermediate sealed filter portion, the said driven bobbin being provided with first and second bearing adapters; a driving motor for the said driven bobbin disposed inwardly of the said base frame; a gear train mounted on a frame member of the said base frame extending from the said motor to the said first bearing adapter and having a width not exceeding the width of the frame member on which it is mounted; wherein the said first of the bearing adapters is capable of being coupled to the said gear train and the second of the said bearing adapters is capable of being coupled to a coupling bearing adapter mounted on a frame member of the base frame opposite to the frame member carrying the said gear train.

The arrangement according to the invention avoids the use of chain drives which require considerable space, and allows several roller band filter assemblies to be mounted side-by-side, and driven by a single motor without requiring a transmission shaft.

The said first and second bearing adapters may each have a push-in square pin portion adapted to push-fit into a hollow square portion of the driven bobbin and a rectangular key portion adapted to fit into a corresponding rectangular socket bearing of the said gear train or the said coupling bearing adapter.

Thus the said first and second bearing adapters may consist of a disc provided on one side with a rectangular key and on the other side with a square section pin.

Thus the gear train may be provided with a rectangular socket bearing in the flat spur gearing and a similar rectangular socket bearing in the coupling bearing adapter mounted in the frame member at the other side. By providing the said coupling bearing and the said flat spur gearing with a like rectangular socket bearing roller band filter assemblies can be connected up on each side of the assembly according to the invention, if required.

In the rear (motor) part of the flat gear train a worm mounted on the motor shaft co-operates with a wormwheel with a pinion. In the front portion of the gear train this pinion drives a flat spur gearing comprising single and double gearwheels of which the final gearwheel is provided with a sprocket.

In order to locate the driven winding-on roll correctly without impairment of its exchangeability, leaf spring clips may be provided as spacing members between the bearing adapters and the flanges of the winding-on bobbin, said clips being clipped on the square section pins of the bearing adapters and withdrawn when the bobbin is to be exchanged.

Figure 2:
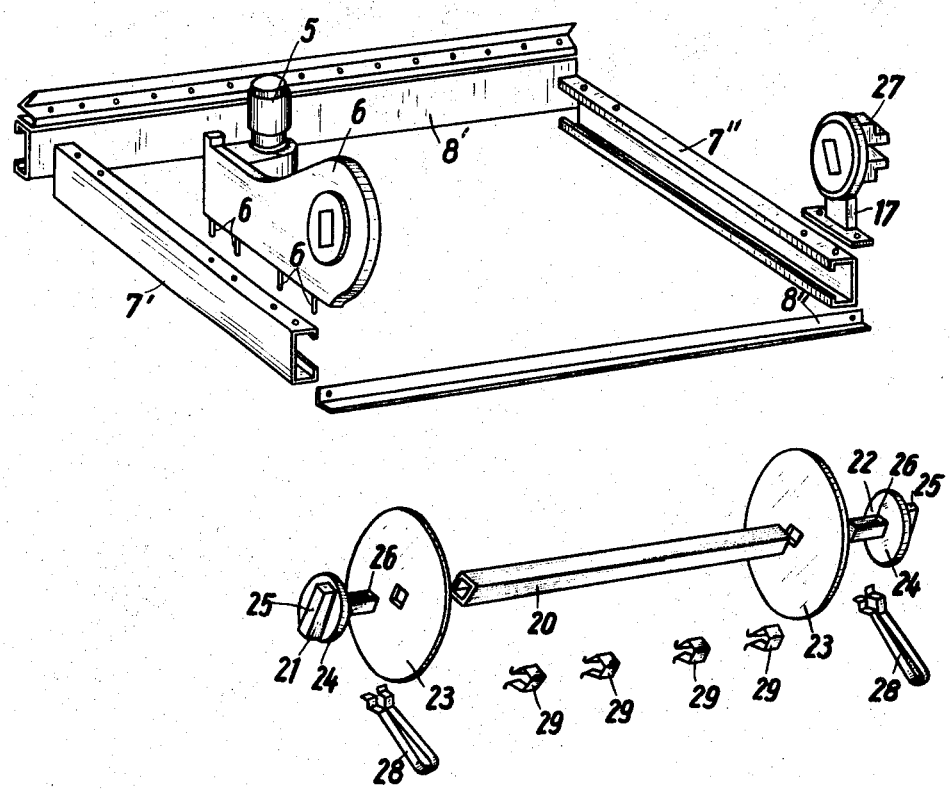

An embodiment of the invention is hereinafter described and illustrated in the accompanying drawings, of which FIG. 1 is a perspective view of a roller band filter assembly according to the invention, FIG. 2 is an exploded perspective view of the bottom end components of the filter, FIGS. 3 and 4 are a side and end-on view of the gear train, FIG. 5 is an axial view of the bearing, FIG. 6 is a vertical section of the bearing according to FIG. 5, and FIG. 7 is a side view of a spacing clip.

Referring particularly to FIG. 1, the assembly consists of an upper portion 1, an intermediate portion 2 and a bottom portion 3. The upper portion 1 contains a roll of filter band roll 30 wound on a freely rotatable bobbin mounted thereon. During use the filter band is wound off the said freely rotatable bobbin and is drawn across the filtering intermediate portion 2, and is finally wound up on a driven bobbin 4 in the bottom portion 3. In the intermediate portion 2 the dust contained in the dust-laden air is deposited on clean filter cloth pulled off the upper bobbin, the dirty cloth being wound onto the bottom bobbin 4. After a given period of time the empty upper bobbin is replaced by a full bobbin, whereas the bobbin 4 containing a roll of dirty filter cloth is removed.

For directly driving the bobbin 4, a motor 5 associated with a reduction gear train 6, is provided.

As shown in FIG. 2, the base frame of the lower portion of the assembly consists of individual members 7' and 7" and 8' and 8". The gear train 6 is mounted on the frame member 7' by means of pins 6' or the like, the width of the gear train 6 not significantly exceeding the width of the frame member 7'. At the rear end of this flat spur gear train is a worm 10 fast on the shaft 9 of a vertically mounted motor 5, said worm co-operating with a wormwheel 11 coaxially associated with a pinion 12. The forward part of the gear train which is driven by the pinion 12 comprises a gearwheel 13, a double gearwheel 14 and a single gearwheel 15 which is provided with a socket hole 16.

The motor 5 may for example be a six-pole standard three-phase motor revolving at 900 to 1000 r.p.m. and having a power rating of 0.25 to 0.34 H.P. The worm 10 may be single-thread worm co-operating with the wormwheel 11 to give a reduction ratio of between 80 and 100 to 1. The pinion 12 drives the gearwheel 13 to provide a reduction ratio of 1.7:1 and the latter drives the double gearwheel 14 to provide a further reduction ratio of 2.59:1. The reduction ratio between the double gearwheel 14 and the final gear 15 may be 4.4:1, driving the bobbin 4 at the resultant speed. Assuming that the motor runs at 910 r.p.m. the speed at the output end of the gear train will thus be 0.6 r.p.m.

This space-saving and very flat transmission which directly drives the bobbin 4 permits several roller band filter assemblies to be coupled adjacent to each other and driven by the same drive means. Thus the final gear of the spur wheel gear train 6 contains a socket hole 16, the coupling bearing member 17 on the frame member 7" at the other side being provided with a corresponding socket bearing 19 mounted in a ball race 18, as shown in FIG. 6. The box section spindle 20 of the driven bobbin 4, together with flanges 23 is mounted in the said bearings 16 and 19 by means of bearing adapters 21 and 22, which each comprise a disc 24 which carries a rectangular key 25 and a square section pin 26. A further filter assembly can then be coupled thereto by a mirror symmetrical member 27 having two keys (see FIG. 2). It will be understood from FIGS. 4 to 6, in which the co-operating members of adjacent units are indicated in chain lines, that the proopsed torque-transmitting socket couplings permit units to be tightly connected together with a maximum economy of space.

The insertion and removal of the lower bobbin 4 may be effected by shifting the box section spindle 20 of the bobbin axially first to the right and then to the left, pulling it off the square pin 26 at one end by pushing it further onto the square pin at the other end and thus removing or reinserting the spindle. The spacers 28 are inserted between the discs 23 and 24. They have the shape resembling leaf spring clips of appropriate width as illustrated in FIG. 7. They are bent to shape from spring steel strip.

For attaching the end of the filter band to the box section spindle 20, clips 29 may be used with advantage.

For pulling the filter band from the centre section 2 towards the bobbin 4, the rear frame member 8' has a deflecting element comprising a roller (not shown in the drawing), over which the filter band is conducted.

What is claimed is:

1. An automatic roller band filter assembly, comprising an upper portion, a lower portion and an intermediate sealed filter portion; a roll of filter band on a bobbin freely rotatably mounted in the said upper portion; a driven bobbin mounted on a base frame in the said lower portion having spaced forwardly projecting side frame members and adapted to receive filter band from the said upper portion after passage through the said intermediate sealed filter portion, the said driven bobbin being provided with first and second bearing adapters; a driving motor for the said driven bobbin disposed inwardly of the said base frame; a gear train mounted on the upper surface of a said frame member of the said base frame extending from the said motor to the said first bearing adapter and having a width not exceeding the width of the said frame member on which it is mounted; wherein the said first of the bearing adapters is capable of being coupled to the said gear train and the second of the said bearing adapters is capable of being coupled to the coupling bearing adapter mounted on a frame member of the base frame opposite to the frame member carrying the said gear train.

2. An assembly according to claim 1, in which the said gear train comprises a rear end containing a wormwheel associated co-axially with a pinion, the said wormwheel being in driven engagement with a driving worm on the motor shaft of the said motor; and a front end comprising a train of spur gears one of which is in driven engagement with the said pinion in the said rear end, the final gear of the said gear train being provided with a bearing socket adapted to engage with the rectangular key of the said first bearing adapter.

3. An assembly according to claim 1, in which each of the said first and second bearing adapters has a push-in square pin portion adapted to push-fit into a hollow square portion of the driven bobbin and a rectangular key portion adapted to fit into a corresponding rectangular socket bearing of the said gear train or the said coupling bearing adapter, the said pin and key portions being separated by a disc portion.

4. An assembly according to claim 3, in which the said coupling bearing adapter has on one side thereof a socket bearing adapted to receive the rectangular key portion of the said second bearing adapter, and on the other side thereof has a further socket bearing adapted for connection to a bobbin in the lower portion of an adjacent roller band filter assembly, the said socket bearings being mounted in a ball race.

5. An assembly according to claim 3, in which leaf spring clips are provided adapted to clip onto the rectangular key portion of the said bearing adapters between the disc portion thereof and a flange of the said driven bobbin, whereby the said leaf spring clip acts as a spacing member.

6. An automatic roller band filter assembly, comprising an upper portion, a lower portion and an intermediate portion; a roll of filter band on a bobbin freely rotatable in the said upper portion; a motor driven filter band bobbin mounted on a base frame in said lower portion and adapted to remove filter band from the said upper portion after passing through the intermediate portion in sealed relation thereto; said base frame extending forwardly from said intermediate portion and under said upper portion and including side members; the improvement which comprises (a) a spur gear reduction train connected to said motor driven filter band bobbin arranged in an elongated casing situated on the upper surface of and extending along one of said side members; (b) said encased spur gear train does not substantially exceed the width of the said side member on which said encased spur gear train is mounted.

References Cited

UNITED STATES PATENTS

| | | | |
|---|---|---|---|
| 1,638,067 | 8/1927 | Szekely | 55—352 |
| 2,606,257 | 8/1952 | Briskin | 74—421.5 |
| 2,848,064 | 8/1958 | Gregory et al. | 55—352 |
| 2,881,859 | 4/1959 | Nutting | 55—352 |
| 3,071,060 | 1/1963 | Forshee | 55—354 |
| 3,350,855 | 11/1967 | Revell | 55—354 |
| 3,359,709 | 12/1967 | Revell | 55—354 |
| 3,449,979 | 6/1969 | Fischer | 74—421 |

FRANK W. LUTTER, Primary Examiner

B. NOZICK, Assistant Examiner